(12) United States Patent
Paulson et al.

(10) Patent No.: US 10,740,577 B2
(45) Date of Patent: Aug. 11, 2020

(54) PASSIVE SENSOR TAG SYSTEM

(71) Applicant: Palo Alto Research Center Incorporated, Palo Alto, CA (US)

(72) Inventors: Christopher Paulson, Redwood City, CA (US); Ramkumar Abhishek, Menlo Park, CA (US); Gregory Whiting, Menlo Park, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 175 days.

(21) Appl. No.: 15/208,225

(22) Filed: Jul. 12, 2016

(65) Prior Publication Data
US 2018/0018481 A1 Jan. 18, 2018

(51) Int. Cl.
*G06K 7/10* (2006.01)
*G01K 1/02* (2006.01)
*G01K 7/00* (2006.01)

(52) U.S. Cl.
CPC ........ *G06K 7/10316* (2013.01); *G01K 1/024* (2013.01); *G01K 7/00* (2013.01); *G06K 7/10336* (2013.01)

(58) Field of Classification Search
None
See application file for complete search history.

(56) References Cited

U.S. PATENT DOCUMENTS

| | | | |
|---|---|---|---|
| 6,025,725 A | 2/2000 | Gershenfeld et al. | |
| 9,536,122 B2* | 1/2017 | Potyrailo | H04Q 9/00 |
| 2006/0244568 A1 | 11/2006 | Tong et al. | |
| 2011/0259953 A1* | 10/2011 | Baarman | G01F 23/20 |
| | | | 235/375 |
| 2014/0296687 A1* | 10/2014 | Irazoqui | A61B 3/16 |
| | | | 600/398 |
| 2016/0084911 A1 | 3/2016 | Mensah-Brown | |
| 2017/0061168 A1* | 3/2017 | Sundaram | G06K 7/0095 |
| 2017/0110796 A1* | 4/2017 | Rokhsaz | H01Q 7/005 |

FOREIGN PATENT DOCUMENTS

| | | |
|---|---|---|
| WO | 2011055014 A1 | 5/2011 |
| WO | 2012095550 A1 | 7/2012 |

* cited by examiner

*Primary Examiner* — Daniell L Negron
(74) *Attorney, Agent, or Firm* — Miller Nash Graham & Dunn LLP

(57) ABSTRACT

A passive sensor tag system including a passive electronic sensor tag and an external readout. The passive electronic sensor tag including a sensor element configured to sense data in a local environment and to cause a shift in a fundamental electrical resonance frequency characteristic of a sensor circuit based on the sensed data. The external readout including an external readout circuit that is configured to generate a signal having a frequency and a voltage and to transmit the signal through an output antenna. The transmitted signal coupling the sensor circuit and the external readout circuit. The external readout determining a fundamental electrical resonance frequency characteristic of the sensor circuit based on the impedance of the coupled sensor circuit and external readout circuit. The external readout determining the sensed data based the fundamental electrical resonance frequency characteristic of the sensor circuit.

11 Claims, 4 Drawing Sheets

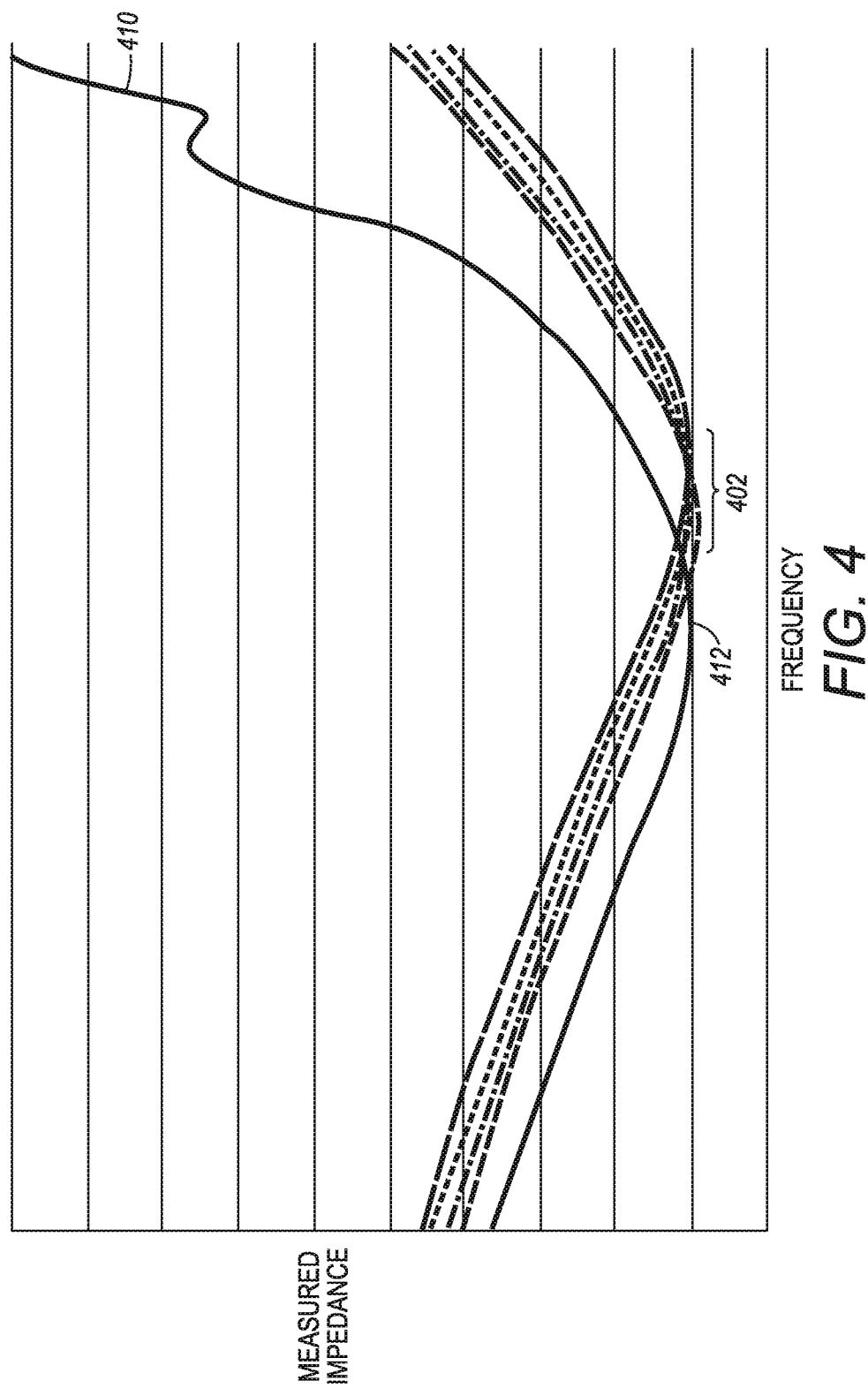

PASSIVE SENSOR TAG SYSTEM

TECHNICAL FIELD

The presently disclosed embodiments are directed to a passive, remote sensor tag system including radio frequency interrogation of the remote sensor tag by an external readout to collect sensed data.

BACKGROUND

Sensors are a vital tool in monitoring the state of and changes in environmental variables such as mechanical stress, temperature, light and other variables. Typically, these sensors require a power source to function, to power the sampling of the sensor or to transmit or output the sensed data. The inclusion of a power source increases the size or form factor of the sensor package, potentially limiting the usability of the sensor package in desired locations. Further, sensor packages can require regular maintenance, such as replacement of the power source, which requires that the sensor package be placed in an accessible location.

As described above, the current remote sensors have significant design and performance specifications that impact their ability to be placed, used or readily accessed in locations as desired. An improved remote sensor having a reduced form factor and reduced maintenance and power requirements would be desirable as this improved sensor could be placed in areas where current remote sensors could not.

SUMMARY

According to aspects illustrated herein, there is provided a passive sensor tag system comprised of a passive electronic sensor tag and an external readout. The passive electronic sensor tag includes a sensor element configured to sense data in a local environment and a sensor circuit having a fundamental electrical resonance frequency. A change in the local environment causes a reactionary change in the sensor element, which alters a fundamental electrical resonance frequency characteristic of the sensor tag. Altering a fundamental electrical resonance frequency characteristic can include shifting the fundamental electrical resonance frequency of the sensor tag, altering the crest and/or trough, such as by widening or narrowing, of a fundamental resonance frequency response of the sensor tag. An external readout includes an external readout circuit that generates a signal at a fixed voltage output that is transmitted through an output antenna to the passive electronic sensor tag.

The external readout circuit determines or calculates a state of the passive electronic sensor tag based on the transmitted output. The state of the passive electronic sensor tag can be characterized by a fundamental electrical resonance frequency characteristic of the sensor circuit of the passive electronic sensor tag. The external readout circuit can determine if a fundamental electrical resonance frequency characteristic of the sensor circuit has been altered or shifted, thereby indicating a reactionary change in the sensor based on a local environmental variable being monitored. The altered fundamental electrical resonance frequency characteristic of the sensor circuit, as measured or calculated by the external readout circuit, can be correlated to an actual measurement of the local environmental variable or to a change therein. For example, the sensed data can be determined based on an effective voltage difference that is determined from the shift in the fundamental electrical resonance frequency of the sensor circuit.

BRIEF DESCRIPTION OF DRAWINGS

FIG. 4 is a chart showing results of the example circuit of FIG. 3.

DETAILED DESCRIPTION

Embodiments and arrangements disclosed herein include a passive sensor tag system that includes a passive sensor tag and an external readout for interrogating the sensor tag. The passive nature of the sensor tag reduces the form factor and power requirement of the sensor tag, allowing it to be placed in a multitude of locations to monitor. The sensor tag can be configured to include a variety of different sensor elements to monitor local environmental variables, including temperature, light, pressure, vibration and mechanical forces such as stress and strain. Additionally, the architecture of the sensor tag allows the size of the sensor tag to be scaled from a large, macro-scale to a small, micro-scale, increasing the versatility of the sensor tag and the potential placement environments.

Figure 1:
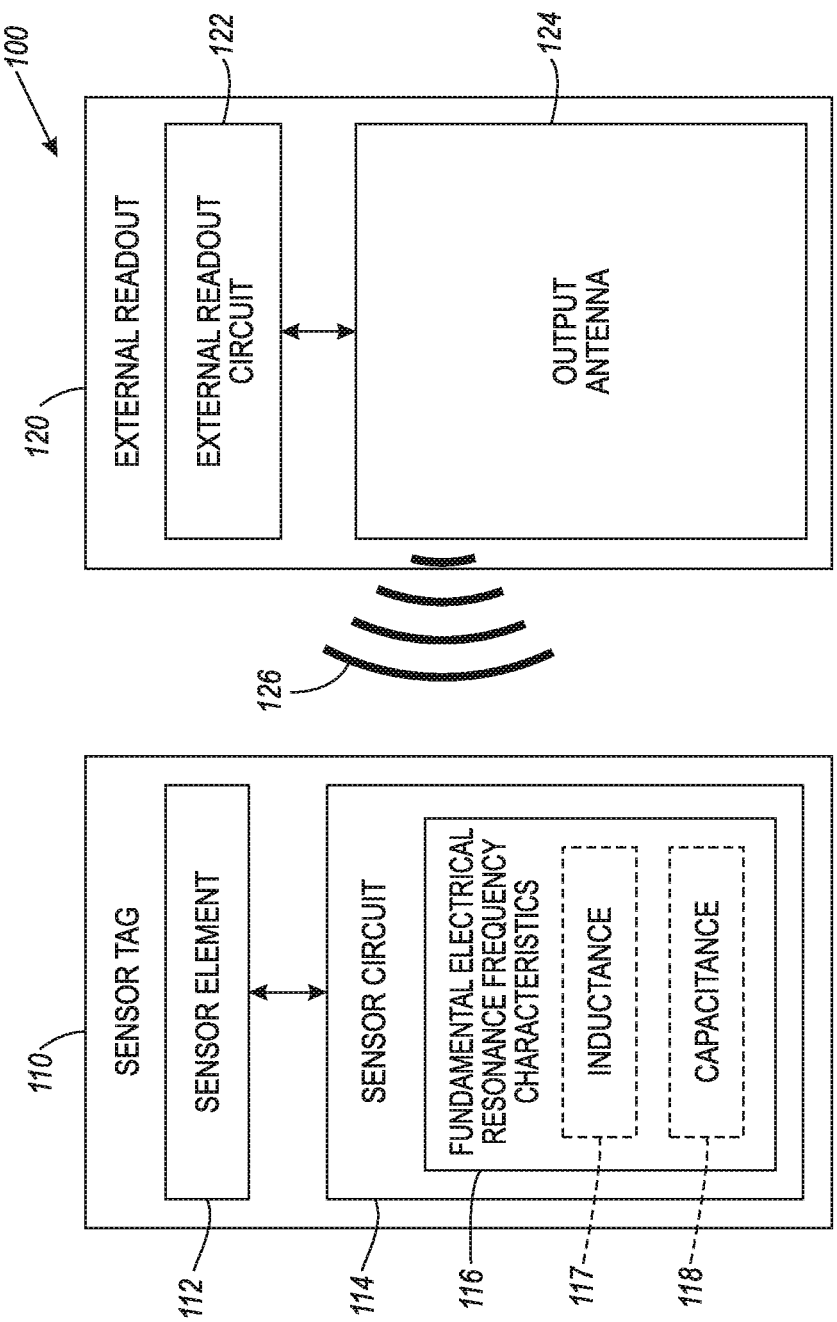
FIG. 1 is an example block diagram of a passive sensor tag system.

FIG. 1 is an example block diagram of a passive sensor tag system 100 that includes a sensor tag 110 to measure a value of or a change in a local environmental variable and an external readout 120 that can interrogate the sensor tag 110 to measure sensed data. The sensor tag 110 is a passive element that alters its state in reaction to a local environmental variable or change therein, the state of the sensor tag 110 can be determined by the external readout 120, which can correlate the state of the sensor tag 110 to the measured value or measured change of the local environmental variable.

The sensor tag 110 includes a sensor element 112 and a sensor circuit 114. The sensor element 112 is capable of sensing or measuring an environmental variable or a change in an environmental variable. The sensor tag 110 is passive as it does not include a power source nor does the tag 110 actively transmit data.

The sensor element 112 changes state in response to a local environmental variable or a change in a local environmental variable. The change in state of the sensor element 112 causes a change in a fundamental electrical resonance frequency characteristic 116 of the sensor circuit 114. The electrical resonance of a circuit occurs when the capacitive and inductive reactances of the circuit are equal in magnitude. Since the capacitive and inductive reactances are 180° out of phase with each other, when resonance is achieved the circuit only has resistive impedance. Reading or measuring an altered fundamental electrical resonance frequency 116 characteristic of a sensor circuit allows the change or shift in the inductive and/or capacitive reactances of the sensor circuit 114 to be measured by comparing a sensor altered fundamental electrical resonance frequency characteristic of the sensor circuit 114 to the same non-altered, or standard, fundamental electrical resonance frequency characteristic of the sensor circuit 114. The measured shift can be translated or correlated with a shift in or value of the measured local environmental variable monitored by the sensor tag 110.

When the sensor tag 110 is interrogated, it is this change in a fundamental electrical resonance frequency characteristic 116 that is interpreted by the external readout 120 as a measured value or a change in measured value that is correlated to the change in or value of the local environmental variable monitored by the sensor tag 110.

A fundamental electrical resonance frequency characteristic 116, such as the fundamental electrical resonance frequency or a characteristic of the signal such as the width of the trough or crest, of the sensor circuit 114 is altered by changing one or both of an inductance 117 or a capacitance 118 of the sensor circuit 114 by the sensor element 112. When the sensor tag 110 is interrogated, the external readout 120 detects, reads and/or measures a change in a fundamental electrical resonance frequency characteristic 116 of the sensor circuit 114. The change in the fundamental electrical resonance frequency characteristic 116 of the sensor tag 110 can be interpreted or correlated to a measured value or a measurable change of a local environmental variable.

The sensor element 112 can cause a change in a voltage of the sensor circuit 114 of the sensor tag 110 in response to the local environment of change therein. An example of a voltage altering sensor element 112 can include a sensor element that includes a piezoelectric material. Piezoelectric material generates voltage when exposed to a mechanical input, inducing mechanical stress or strain in the material, the amount of generated voltage is indicative of the amount of stress or strain in the piezoelectric material. However, this change in voltage of the sensor circuit 114 must be converted or expressed as a change in the inductance 117 or capacitance 118 of the sensor circuit 114, to cause a change a fundamental electrical resonance frequency characteristic 116 of the sensor circuit 114. The sensor circuit 114 may require additional elements that can facilitate the conversion or translation of the change in the voltage of the sensor circuit 114 into a change in the inductance 117 and/or capacitance 118 of the sensor circuit 114, which in turn alters a fundamental electrical resonance frequency characteristic 116 of the sensor circuit 114. Such additional elements can include varactor diodes, which are a diode having a voltage-dependent capacitance. The voltage generated by the sensor element 112 can be converted into a change in capacitance of the sensor circuit 114 by the inclusion of a varactor diode in the circuit.

Selection of the sensor element 112 is dependent on the environmental variable to be measured or monitored. The sensor element 112 can take many forms, such as a sensor element 112 that has an alterable capacitance value that is changed in response to a change in a local environmental variable or an alterable inductance value that is changed in response to a change in a local environmental variable. Examples of such sensors include proximity sensors, pressure sensors, temperature sensors, stress and strain sensors, and other sensors. Additionally, the sensor element 112 can be voltage generating or altering in nature, the change in voltage altering a fundamental electrical resonance frequency characteristic 116 of the sensor circuit 114 in the sensor tag 110.

In example embodiments, the sensor element 112 can be a sensor element that alters its capacitance in response to or based on a change in the local environment in which the sensor tag 110 is placed. An example capacitive sensor element 112 can be a position sensor, a motion sensor or other type sensor that uses a capacitance to monitor or register a change in a desired measurable variable. Capacitance based sensors can include a microelectromechanical systems (MEMS) capacitor based sensor, such as an accelerometer or pressure sensor. A MEMS sensor is small scale, such as on the order of microns to millimeters, allowing placement of the sensor in local environments and locations that would otherwise be difficult.

In further embodiments, the sensor element 112 can be a sensor element that alters its inductance in response to or based on changes in the local environment in which the sensor tag 110 is placed. An example inductive sensor element 112 can include a metal coil inductor that changes its inductance in response to the stress and/or strain exerted on the sensor element 112. As the one or more coils of the example metal coil inductor are compressed or expanded, the inductance of the metal coil inductor is commensurately altered. The change of the inductance of the sensor element 112 causes a change in a fundamental electrical resonance frequency characteristic 116 of the sensor circuit 114. As with the capacitive-type sensor element 112 discussed previously, an inductive-type sensor element 112 can be similarly small-scale.

In yet further embodiments, the sensor element 112 can be a voltage generating element, such as a sensor containing a piezoelectric element. Piezoelectric material is a class of materials that generate a voltage in response to a mechanical stress exerted upon the material. A piezoelectric sensor is therefore suited for measuring changes in pressure, acceleration, strain or force. As the change in local environment is registered as a voltage generation by a piezoelectric-type sensor element 112, additional circuit elements can be included in the sensor circuit 114 to translate the voltage generation into a change in a fundamental electrical resonance frequency characteristic 116 of the sensor circuit 114. Such circuit elements can include a varactor diode having a voltage dependent capacitance, which translates the voltage generation by a sensor element 112 into a capacitance 118 change in the sensor circuit 114 and causes a change in a fundamental electrical resonance frequency characteristic 116 of the sensor tag 110.

Additional voltage generating type sensor elements 114 can include temperature and light sensor elements 114. A temperature sensor, such as a thermocouple, can exhibit temperature dependent voltage generation that can be translated into a change in a fundamental electrical resonance frequency characteristic 116 of the sensor circuit 114. A light sensor, such as a photovoltaic cell, can generate a voltage in response to light exposure. The generated voltage can be translated into a change in a fundamental electrical resonance frequency characteristic 116 of the sensor circuit 114.

Single or multiple sensor elements 112 can be included in the sensor tag 110 to achieve the desired monitoring of the local environment as desired. Alternatively, multiple sensor tags 110 can be placed in a similar location to monitor not only a desired local environmental variable, but also additional local environmental variables that may contribute to change in the principally monitored variable.

An example sensor tags 110 can include multiple sensor elements 112 and corresponding sensor circuits 114. For example, a first sensor element 112 can measure a dimension of a crack in a structure and a second sensor element 112 of the sensor tag 110 can monitor a secondary variable, such as ambient temperature. The measured data of the two variables, the dimension of the crack and the ambient temperature can be correlated and patterns can be investigated to determine the affect the secondary variable, temperature, has on the first measured variable, the dimension of the crack. One of the benefits having both sensor elements 112 integrated into a single sensor tag 110 is that the data is collected from substantially the same point, allowing direct cause and effect relationships to be investigated and evaluated. To ease the reading of the first and second fundamental electrical resonance frequency characteristics 116 of the first and second sensor circuits 114, respectively, each of the sensor circuits 114 can be tuned to differing frequencies such that two distinct and separate frequency responses can be measured by the external readout 120 when the sensor tag 110 is interrogated. In a further embodiment, multiple sensor elements 112 and sensor circuits 114 can be disposed on a single sensor tag. One or more sensor elements can measure or monitor a primary local variable, and the remaining sensor elements can measure multiple or various secondary local variables, that may or may not be contributory factors to the changes measured in the primary local variable. Analysis of the collected data can lead to determinations of contributory secondary variables and their degree of contribution to the effects measured of the primary variable.

In a further example, different sensor elements 112 on individual sensor tags 110 can be placed in a location to monitor a variety of variables, from which correlation can be investigated and cause-and-effect analyzed. Similar to the example above, a first sensor tag 110 can be placed to monitor the expansion of a structural crack and additional sensor tags 110 can be placed nearby to monitor other, secondary and potentially contributory, environmental variables such as temperature and vibration. Unlike the above example, each sensor tag 110 can be interrogated The collected data regarding the first variable, the structural crack, can then be evaluated in light of the data collected regarding the secondary variables, from this a correlation can be established and mitigating efforts can be taken to reduce the secondary variable impacts on the first variable.

In yet another example, multiple sensor tags 110 measuring the same environmental variable can be placed across a large area to measure a gradient of the sensed environmental across the area. For example, multiple temperature sensing sensor tags 110 can be placed throughout a structure to monitor temperature fluctuations over time throughout the structure. This can be useful in monitoring the ventilation and temperature control systems within the structure for uniformity throughout the structure.

The sensor element 112 and sensor circuit 114 of the sensor tag 110 can be an RLC-type circuit having a fundamental resonance frequency 116. Changes in a fundamental electrical resonance frequency characteristic 116 indicate change in a local environmental variable to which the sensor element 112 is attuned. While various elements of the RLC-type circuit, the resistance (R), the inductance (L) and/or the capacitance (C), can be altered in response to a change in the environmental variable, only changes to the inductance and/or capacitance of the RLC-type circuit cause a change in a fundamental resonance frequency characteristic 116.

The sensor tag 110, including its various elements, such as the sensor element 112 and the sensor circuit 114 can be constructed or printed onto a thin film substrate to create a thin film sensor circuit 114 and/or sensor element 112. Creating the sensor tag 110 as a thin film circuit results in a sensor tag having a low profile and a degree of flexibility. The low profile and flexibility of the thin film circuit based sensor tag 110 allows the sensor tag to be placed in a variety of locations. The flexible nature of the thin film sensor tag 110 allows it to be placed conformally about an object or area which can allow for direct measurements of a variable such as vibration, movement, pressure and other variables the surface of and/or the object experiences. Additionally, the low profile of the sensor tag 110 can allow it to be placed in tight areas, such as cracks, crevices, behind objects, and other, otherwise inaccessible locations. The thin film can consist of a polyethylene naphthalate (PEN) material, a polyethylene terephthalate (PET) material or other suitable, flexible material. Circuit elements can be placed, formed, such as by lithography, or printed onto the thin film to create the required circuitry of the sensor tag 110.

Low-temperature polysilicon processing can be used to fabricate semiconductor elements on the thin film. The fabrication of the sensor tag 110 using polysilicon semiconductor formation on a flexible polymer base allows the sensor tag 110 to be placed conformally about objects or locations in which a local environmental variable is to be monitored. Because the sensor tag 110 does not require its own power source, once the sensor tag 110 is placed it requires little to no maintenance and functions for an extended period of time. Placement of the sensor tag 110 can be assisted with the inclusion of an adhesive backing on the thin film sensor tag 110. With the adhesive backing, the sensor tag 110 can be placed quickly and easily, much like a sticker.

Additionally, the thin film sensor tag 110 can include a top coating of thin film or other material to protect the sensor tag 110 from the environment allowing the sensor tag 110 to be placed in a variety of areas and environments. In this manner, the entire sensor tag 110 can be encapsulated in a protective material. This can extend the usable life of the sensor tag 110 by preventing or slowing damage to the sensor tag 110. Also, the protective coating can protect the sensor tag 110 from the local environment, inhibiting or reducing damage to the sensor tag 110.

An example can include a sensor tag 110 that measures the temperature of the interior of a corrosive environment. Coating the sensor tag 110 in a material resistant to corrosion inhibits or slows the corrosion of the sensor tag 110 within such an environment. Further, the extended usable life of the sensor tag 110 reduces the replacement cycle of the sensor tag 110, which can limit personnel exposure to hazardous environments and/or limit the impact replacement of the sensor tag 110 has on operations.

Additionally, the sensor tag 110 can be coated to prevent local environmental variables, other than the one being measured or monitored by the sensor element 112, from effecting the fundamental electrical resonance frequency characteristics 116 of the sensor tag 110. While many of these local environmental variables effects on the fundamental electrical resonance frequency characteristics 116 of the sensor tag 110 can be accounted for when measuring or correlating the read fundamental electrical resonance frequency characteristic 116 of the sensor circuit 114 by the external readout 120, the protective coating can assist with preventing unwanted or undue impact of non-monitored environmental variables on the fundamental electrical resonance frequency characteristics 116 of the sensor tag 110.

In an example embodiment, a sensor tag 110 can be placed on an existing crack in a structure, locations where structural cracks are anticipated to occur or locations where the formation of structural cracks can be a significant safety concern. The sensor tag 110 can include a sensor element 112 capable of capacitively or inductively monitoring strain experienced by the structure at the mounting location. Such a sensor tag 110 can monitor the formation of a crack and/or the progress of an existing crack, allowing inspectors to check if a crack has been formed of if the crack is growing, the rate at which the crack is growing. This information can be used to determine if and when action is required to preserve the integrity or safety of the structure.

Alternatively, a structure or object can have strain or stress sensing sensor tags 110 placed in selected or random locations on a structure or object. These sensor tags 110 can monitor the stress or strain of the object or structure within their local environment. This information can be regularly collected to quickly and easily assess the integrity of the object or structure. Since this monitoring can be regularly conducted, the information from the sensor tags 110 allows preventative or remedial actions to be taken before critical issues arise.

Data from the sensor element 112 of the sensor tag 110 is read by the external readout 120. The local environmental variable monitored or measured by the sensor tag 110 causes a reaction by the sensor element 112 that alters a fundamental electrical resonance frequency characteristic 116 of the sensor circuit 114. The external readout 120 can interrogate the sensor circuit 114 of the sensor tag 110 by transmitting an output signal 126. The output signal 126 allows the external readout 120 to read a state of the sensor circuit 114, such as a fundamental electrical resonance frequency characteristic 116 of the sensor circuit 114. As a fundamental electrical resonance frequency characteristic 116 of the sensor circuit 114 is altered by the state of the sensor element 112, a change or state of the local environmental variable can be determined from the altered fundamental electrical resonance frequency characteristic 116. The measured or determined fundamental electrical resonance frequency characteristic 116 of the sensor tag 110 can be compared to a known base or previously measured or determined of the same fundamental electrical resonance frequency characteristic of the sensor circuit 114 to measure or calculate a change in or value of the monitored local environmental variable. In addition to determining or reading a fundamental electrical resonance frequency characteristic 116 of the sensor circuit 112, the readout 120 can also correlate the read or determined fundamental electrical resonance frequency characteristic 116 to a measured change in the local environmental variable by comparing to previously read or determined fundamental electrical resonance frequency characteristic of the sensor circuit 112. The readout 120 can also correlate the read fundamental electrical resonance frequency characteristic 116 to a measured value of the local environmental variable by comparing to known values of the local environmental variable and their corresponding fundamental electrical resonance frequency characteristics of the sensor circuit 112.

In an example embodiment, an effective voltage difference can be determined from the change in a fundamental resonance frequency characteristic 116 of the sensor tag 110. The effective voltage difference can be the change in voltage of the sensor circuit 114 caused by a piezoelectric based sensor element, for example. This change in voltage can be converted by varactor diodes into a change in the capacitance of the sensor circuit 114 which alters a fundamental electrical resonance frequency characteristic that can then be read by the external readout 120 and equated or correlated to a real measured value or change in the local environmental variable that the sensor tag 110 is monitoring.

In an embodiment, the external readout can transmit or output multiple signals across a spectrum of frequencies or "frequency sweep" to measure one or more fundamental electrical resonance frequency characteristics of the sensor tag 110. The multiple signals of various frequencies can be transmitted individually in succession or in a single burst. The external readout circuit 122 can monitor the affect the sensor tag 110 has on the transmitted frequencies to determine a fundamental electrical resonance frequency characteristic 116 of the sensor circuit 114.

The passive sensor tag 110 can be placed in virtually any environment due to the scalability of the tag 110, from a small scale to a large scale, and the lack of a power requirement. Once placed, the external readout 120 is brought proximal to the sensor tag 110 such that a transmission from the external readout 120 can be received by the sensor tag 110 with enough signal power to induce the required current to energize the sensor circuit 114 of the sensor tag 110.

In an example, a small scale sensor tag 110, on the order of millimeters or less, allows the sensor tag to be placed discretely on objects, within objects or on similarly small scaled objects or structures. In an example, a small scale sensor tag 110, having a light sensor element, can be placed on a piece of artwork. The small scale nature of the sensor tag 110 and its ability to conformally attach to an object allow the sensor tag 110 to be placed discretely on the front of the artwork, either on the work itself or the frame. The light sensor element of the sensor tag can transmit light exposure information to the external readout, allowing conservators to assess the potential damage caused to the artwork and determine if mitigation is required to preserve the artwork. In further forms, the size of the sensor tag 110 can be scaled considerably smaller if an antenna of the sensor circuit is placed external to the main sensor tag 110 containing the sensor element 112 and a portion of the sensor circuit 114, absent the antenna element. Since the antenna need only be electrically connected to the sensor circuit 114, it can be placed remotely while maintaining the functionality of the sensor tag 110. Additionally, the sensor tag 110 can be placed on a structural object that can be or function as an antenna for the sensor tag 110. The structural object can be a metallic structure that has been designed to function as an antenna onto which the sensor tag 110 can be placed and electrically connected to. The metallic structure and accompanying sensor tag 110 can be placed in a location to monitor a local environmental variable.

A large scale sensor tag 110, on the order of inches or feet, can be placed on a large structure, such as a building or pipe, to monitor stress or strain within the structure. In an example, the structure can be a pressurized pipe containing gas or liquid, with the sensor tag 110 placed conformally about the interior or exterior of the pipe or a structure located inside the pipe, to monitor stress and/or strain within the pipe. For instance, stress and/or strain with the pipe can be induced due to the flow of a gas or liquid in the pipe. By monitoring the stress and/or strain within the pressurized pipe, the pipe can be regularly assessed for safety to prevent premature and/or catastrophic failure, or detect blockage of flow of a gas or liquid in the pipe. Further, multiple sensors can be placed along a pipeline to monitor each section and a reader can be sent through the pipeline to collect data from each of the sensors.

Alternatively, a single external readout 120 can be permanently or temporarily placed near one or more sensor tags 110, the external readout 120 can target each sensor tag 110 for interrogation. In a further alternative, each sensor tag 110 can be tuned to a different and distinct frequency such that the external readout 120 can interrogate each sensor tag 110 individually by altering or sweeping the frequency of the signal broadcast.

In an embodiment in which the external readout 120 is placed near one or more sensor tags 110 for an extended period of time, the external readout 120 can regularly and repeatedly interrogate the sensor tag(s) 110. In this manner, a continuous or regular monitoring of the local environmental variable can be accomplished.

Figure 2:
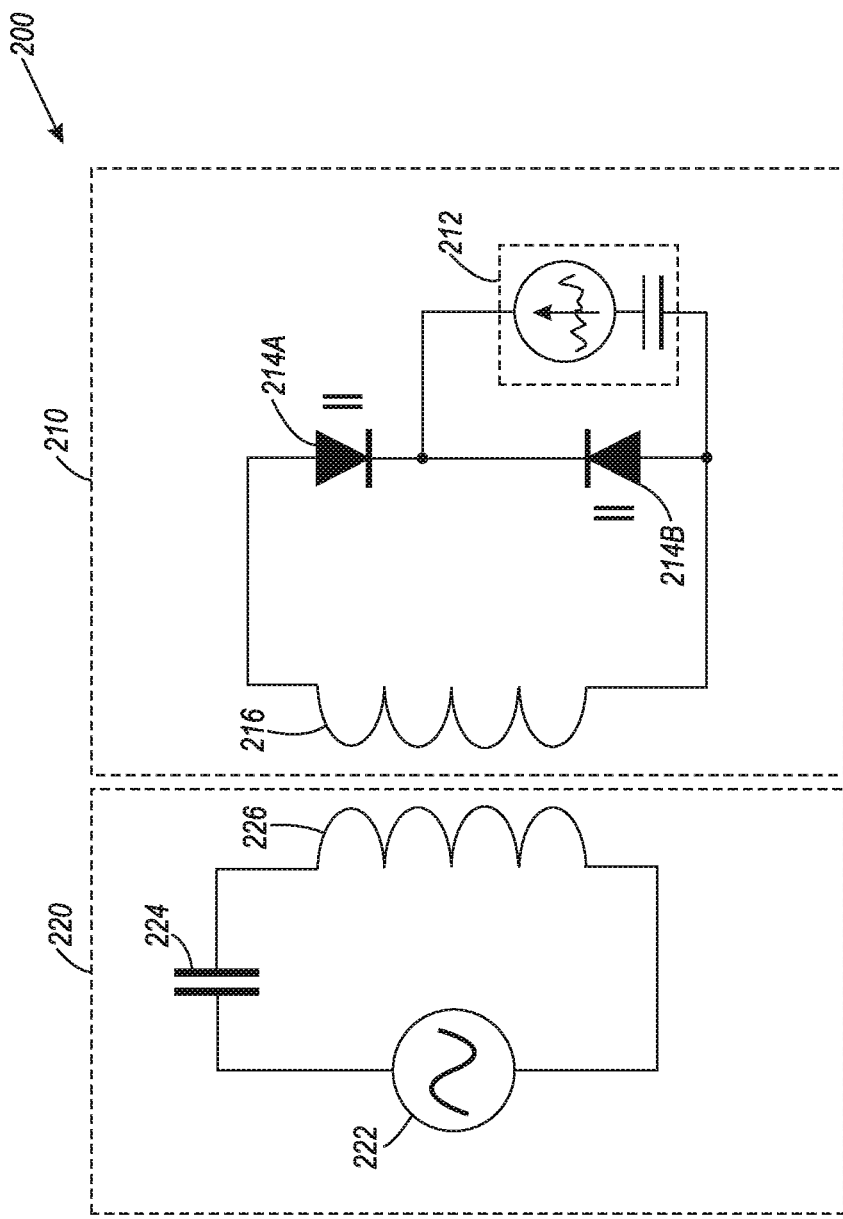
FIG. 2 is an example circuit diagram of a passive sensor tag system.

FIG. 2 is an example circuit diagram of a passive sensor tag system 200. The sensor tag system 200 includes an external readout 220 and a sensor tag 210. The external readout generates and transmits a signal towards the sensor tag 210. The external readout 220 can monitor various characteristics of the external readout circuit and the outputted signal to determine a fundamental electrical resonance frequency characteristic of the sensor tag 210. A change in a fundamental electrical resonance frequency characteristic of the sensor tag 210 indicates a physical change in a sensor element, which further indicates a change in a monitored, local environmental variable. The change in a fundamental electrical resonance frequency characteristic of the sensor tag 210 can be correlated to a physical value of the monitored, local environmental variable or into an amount of change in the variable.

An example external readout 220 includes a voltage source 222, a capacitor 224 and an antenna 226. The voltage source 222 charges the capacitor 224 to generate the signal that is output by the antenna 226. Not shown is the circuitry and/or processor that can be required to determine a fundamental resonance frequency characteristic of the sensor tag 210 based on the signal. The necessary elements and/or processor can be included in the external readout 220 or in an external system or device.

The example sensor tag 210 includes a voltage generating sensor element 212, a pair of reverse biased varactor diodes 214A and 214B and an antenna 216. The voltage generating sensor element 212 is a piezoelectric sensor that generates a voltage in response to external mechanical stress, in the example circuit shown in FIG. 2. The sensor element 212 is placed between the two reverse biased varactor diodes 214A and 214B, such that the voltage generated by the sensor element 212, in response to a change in the local environmental variable, alters the capacitance of the diodes 214A and 214B. The change in capacitance of the varactor diodes 214A and 214B causes a measurable shift in a fundamental electrical resonance frequency characteristic of the sensor tag 210. The shift in the fundamental electrical resonance frequency characteristic can be read or determined by the external readout 220 to determine a change in or value of the monitored local environmental variable.

The change in a fundamental electrical resonance frequency characteristic can be correlated to a degree or amount of change in the local environmental variable or alternatively into a measure of the local environmental variable, for example, the measured temperature of the local environment rather than the amount of temperature change in the local environment.

The sensor tag 210 can include any of the previously discussed sensor elements. In the case of a voltage generating sensor element, at least one element capable of converting the generated voltage into a change in the capacitance of the sensor circuit, such as a varactor diode, must be included. As a change in a fundamental electrical resonance frequency characteristic of the sensor tag 210 is required for the system 200, the capacitance and/or the inductance of the sensor tag 210 must be changed in response to a change in the local environmental variable.

Figure 3:
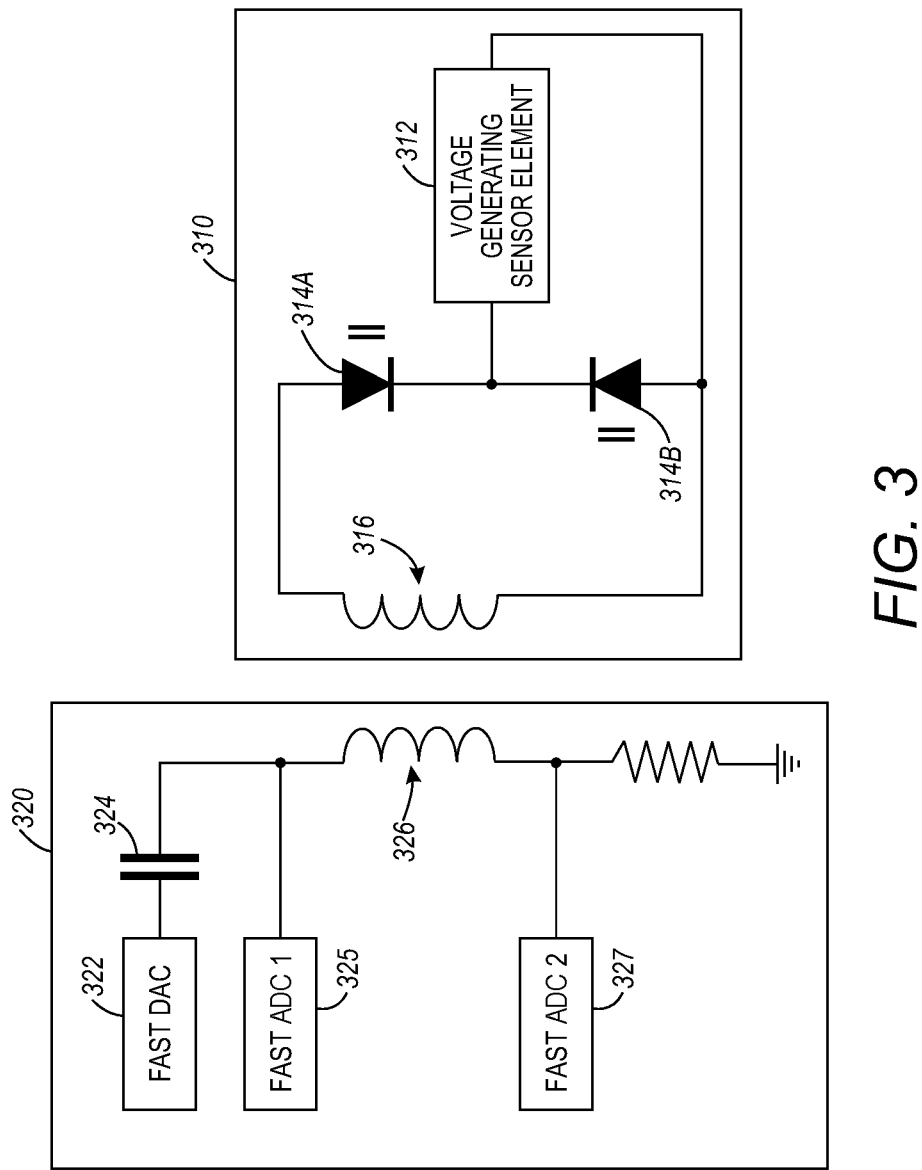
FIG. 3 is an example circuit diagram of a passive sensor tag system.

FIG. 3 illustrates an example sensor circuit 310 and an example external readout circuit 320. The example external readout circuit 320 outputs a frequency sweep at various voltages from an antenna 326 to determine a fundamental electrical resonance frequency characteristic, such as a fundamental electrical resonance frequency, of the sensor circuit 310. The sensor circuit 310 includes an antenna 316 and a pair of reverse biased varactor diodes, 314A and 314B, to cause a change in a fundamental electrical resonance frequency characteristic of the sensor circuit 310 in response to the voltage generated by the voltage generating sensor element 312.

The external readout circuit 320 includes a fast digital-to-analog converter (DAC) 322, a capacitor 324, an antenna 326, a pair of fast analog-to-digital converters (ADC's) 325 and 327, and a resistor 328 going to ground. The fast DAC 322 and the capacitor 324 of the external readout circuit 320 generates a signal, at a given frequency and voltage, that is output through the antenna 326. The pair of ADC's, 325 and 327, sample the output signal before and after the antenna 326. Since the resistor 328 has a fixed resistance, a voltage drop across the antenna 326 can be measured based on the sampling by the ADC's 325 and 327. The impedance of the coupled system, the external readout circuit 320 and sensor circuit 310, can be calculated. Repeating this across a range of frequencies at fixed voltages allows a center frequency of the coupled system to be determined. At a center frequency of the system equal to the fundamental electrical resonance frequency of the sensor circuit 310, due to the increased power draw of the coupled sensor circuit 310 the calculated impedance of the system will reach a local minima, when the output signal of the external readout circuit 320 is at a resonance frequency of the sensor circuit 310.

FIG. 4 is an example chart showing the measured impedance of the system of FIG. 3 over a range of frequencies, at various voltages output by the voltage generating sensor element 312 corresponding to each trace on the chart. At the voltage indicated by trace 410 on the chart, there is a shift in the central frequency 412 away from the central frequency 402 at the other voltages. Additionally, there is a divergent spike in the impedance of the system, as shown by the trace 410, indicative of the increased power draw of the coupled sensor circuit 310, which can be correlated to the fundamental electrical resonance frequency of the sensor circuit 310.

A measured change in or value of the monitored local environmental variable can be determined by comparing a fundamental electrical resonance frequency characteristic of the sensor circuit 310, as read by the external readout circuit 320, to a previous or baseline of the same or other fundamental electrical resonance frequency characteristic of the sensor circuit 310. A baseline fundamental electrical resonance frequency characteristic of the sensor circuit 310 is determined when the sensor element, such as 312 is not effected by an environmental variable. The baseline is a fundamental electrical resonance frequency characteristic of the sensor circuit 310 based solely on the circuit elements in an unaltered or unaffected state. The change in a fundamental electrical resonance frequency characteristic of the sensor circuit 310 indicates a value of or a quantifiable change in the monitored local environmental variable. The amount of change in or the measure fundamental electrical resonance frequency characteristic of the sensor circuit 310 can be correlated by the external readout, or other device, to a measured change in or value of the monitored local environmental variable.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A passive sensor tag system, comprising:
a passive electronic sensor tag having a sensor element and a sensor circuit, the sensor element configured to sense a change in a local environmental variable and to alter a fundamental electrical resonance frequency characteristic of the sensor circuit as a result of the change in the local environmental variable, wherein the local environmental variable is one of light, temperature, pressure, vibration, stress, and strain;
an external readout including an external readout circuit configured to generate a signal having a frequency and a voltage and to transmit the signal through an output antenna to the passive electronic sensor tag, wherein the external readout circuit includes a first analog-to-digital converter (ADC) sampling the signal before the output antenna and a second ADC sampling the signal after the output antenna, the external readout determining the impedance of the coupled system based on the sampling of the first ADC and the second ADC, the transmitted signal coupling the sensor circuit and the external readout circuit, the external readout determining the fundamental electrical resonance frequency characteristic of the sensor circuit from a change in an impedance of the coupled sensor circuit and external readout circuit, the external readout determining the change in the local environmental variable from the alteration in the fundamental electrical resonance frequency characteristic of the sensor circuit, wherein the fundamental electrical resonance frequency characteristic is one of a fundamental electrical resonance frequency of the sensor circuit, a width of a resonance frequency response trough, a width of a resonance frequency response crest, and quality factor of the resonance.

2. The system of claim 1, wherein the sensor circuit includes at least one capacitance value and one inductance value and the sensor element is configured to alter a the fundamental electrical resonance frequency characteristic of the sensor circuit from a change in one or both of the at least one capacitance value and the at least one inductance value.

3. The system of claim 2, wherein the sensor circuit further includes a voltage generating sensor element and a voltage-capacitance conversion element, wherein the voltage-capacitance conversion element is configured to generate an output of capacitance change reflecting the converted voltage change.

4. The system of claim 3, wherein the voltage generating sensor includes piezoelectric material and the voltage-capacitance conversion element includes at least one varactor diode.

5. The system of claim 3, wherein the sensor circuit is a thin film circuit.

6. The system of claim 1, wherein the sensor circuit includes an RLC resonant circuit with at least one fundamental electrical resonance frequency characteristic and the sensor element is configured to alter the fundamental electrical resonance frequency characteristic of the sensor circuit based on a change in one or both of the capacitance and the inductance value.

7. The system of claim 1, wherein the sensor element includes one of a microelectromechanical sensor (MEMS) capacitor, a metal coil inductor, and a piezoelectric material.

8. The system of claim 1, wherein the passive electronic sensor tag is configured to be attached to an object.

9. The system of claim 8, wherein the object is configured to be attached to a physical structure so that the object is then configured to sense one or both of parameters in the local environment and parameters affecting the condition of the physical structure.

10. The system of claim 1, wherein the impedance of the coupled system is determined by measuring the voltage drop of the transmitted signal across the output antenna.

11. The system of claim 1, wherein the signal is generated by a digital-to-analog converter.

* * * * *